Feb. 16, 1954     J. L. LEHMAN     2,669,056
MOUSETRAP
Filed March 24, 1949
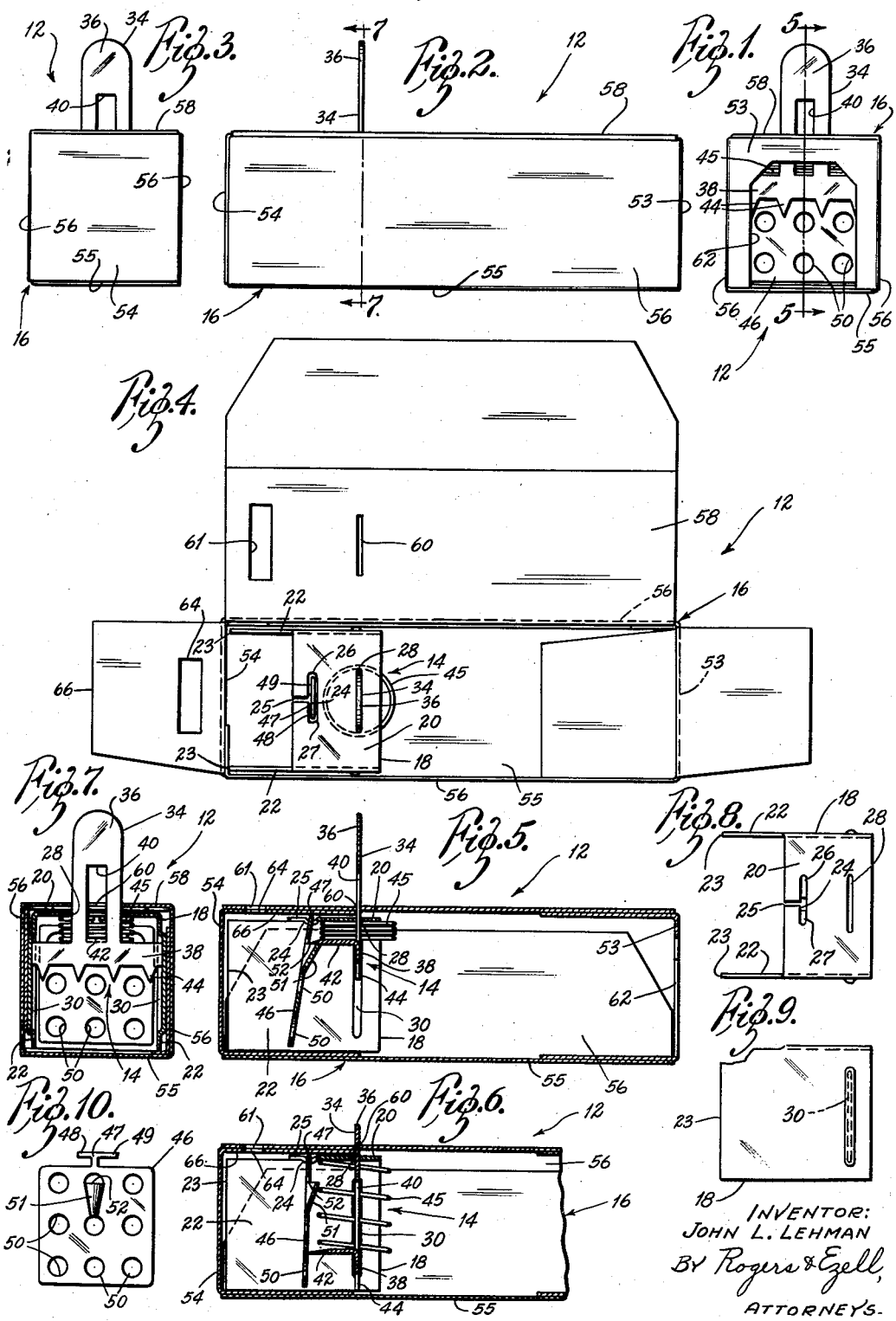
INVENTOR:
JOHN L. LEHMAN
BY Rogers & Ezell,
ATTORNEYS.

Patented Feb. 16, 1954

2,669,056

UNITED STATES PATENT OFFICE 2,669,056

MOUSETRAP

John L. Lehman, St. Louis, Mo.

Application March 24, 1949, Serial No. 83,179

6 Claims. (Cl. 43—79)

The present invention relates generally to animal exterminating devices, and more particularly to a novel mouse or rat trap which is disposed of along with the remains of the trapped mouse or rat.

In the known types of mouse traps which are continuously re-used, the task of removing the dead mouse is usually a very disagreeable one, especially for women. Also, the known traps leave the battered remains of the mouse exposed to view, and according to the medical profession are most unsanitary and spread many diseases. The type of trap in which a U-shaped wire member snaps over the edge of a thin wooden block has the particular disadvantage of often snapping closed on the fingers of the one who is attempting to set it. Another disadvantage of this same type of trap is that the bait usually has to be tied to the pan to prevent it from being stolen.

It is an object of the present invention, therefore, to provide a novel trap whereby the remains of the trapped rodent are disposed of in a most sanitary manner.

Another object is to provide a trap which conceals the remains of the trapped rodent.

Another object is to provide a trap which is disposed of along with the remains of the rodent.

Another object is to provide a trap from which the rodent cannot steal the bait.

Another object is to provide a trap which can be set without any possibility of it catching the fingers of a person setting it.

Other objects are to provide a mouse trap which is simple in construction, has a minimum number of parts, and which is relatively inexpensive to manufacture and assemble.

Further objects and advantages of the present invention will be apparent from the following description, reference being had to the accompanying drawing wherein a preferred embodiment of the present invention is shown, in which:

Fig. 1 is a front elevational view of a trap made in accordance with the teachings of the present invention, showing the plunger in the cocked position;

Fig. 2 is a side elevational view of the trap;

Fig. 3 is a rear elevational view of the trap;

Fig. 4 is a top plan view of the trap with the top of the container open so as to show the inner construction of it.

Fig. 5 is a longitudinal vertical sectional view taken on the line 5—5 in Fig. 1, showing the plunger in the cocked position;

Fig. 6 is a fragmentary vertical sectional view similar to Fig. 5, but showing the plunger in the tripped position;

Fig. 7 is a transverse vertical sectional view taken on the line 7—7 of Fig. 2;

Fig. 8 is a top plan view of the U-shaped frame of the plunger assembly;

Fig. 9 is a side elevational view of the frame of the plunger assembly; and

Fig. 10 is a front elevational view of the trip plate of the plunger assembly.

Referring to the drawing more particularly by reference numerals, 12 indicates generally a mouse trap made in accordance with the teachings of the present invention which includes a plunger assembly 14 disposed within a container 16.

The plunger assembly 14 includes an inverted U-shaped frame 18 (Figs. 8 and 9) which has a transverse top portion 20 and depending leg portions 22, the latter containing edges 23. A transverse groove 24 is formed in the top portion 20 parallel with and adjacent to one edge thereof. A short slot 25 is also formed in the top portion 20 perpendicular to the groove 24, and extends from the groove to the edge of the frame adjacent thereto. As shown in Fig. 8, the slot 25 divides the groove 24 into two portions 26 and 27, the portion 26 being longer than the portion 27 for a purpose to be described hereinafter. An elongated slot 28 is formed in the top portion 20 parallel with and adjacent the edge opposite to the one which contains the short slot 26.

Vertical grooves 30 are formed in the inner faces of the leg portions 22 parallel with the edges thereof and in alignment with the long slot 28. The grooves 30 do not extend the full length of the leg portions 22, but terminate short of the ends thereof for a purpose to be described hereinafter.

An inverted T-shaped plunger 34 (Fig. 7), which includes a stem portion 36 and a transverse portion 38, is disposed in the frame 18 with the stem portion 36 in the slot 28 and the ends of the transverse portion 38 in the grooves 30. It is apparent that the plunger 34 can reciprocate vertically a distance equal to the length of the grooves 30. A rectangularly shaped slot 40 is contained in the stem portion 36, and a tab 42 (Figs. 5 and 6) is formed substantially perpendicular to the plunger 34 at the lower end of the slot 40. V-shaped teeth 44 depend from the transverse portion 38. A coil spring 45 is disposed around the stem portion 36 between the transverse portion 38 of the plunger and the transverse top portion 20 of the frame 18.

A trip plate 46 (Fig. 10) having a T-shaped projection 47 formed on the upper end thereof is pivotally mounted in the groove 24 on the top portion 20. The T-shaped portion 47 has cross portions 48 and 49 of unequal length, the portion 49, which is the longer, being disposed in the portion 26 of the groove 24. A plurality of openings 50 are formed in the body of the plate 46 and a detent 51, which includes a shoulder portion 52, is formed in the upper portion thereof for a purpose to be described hereinafter.

The container 16, which is made of cardboard or like material, is rectangular in shape and includes a front wall 53, a rear wall 54, a bottom wall 55, side walls 56, and a top wall 58 which is hinged to the upper edge of a side wall 56. As shown in Fig. 4, a first transverse slot 60 is formed in the top wall 58 so as to accommodate the free end of the stem portion 36 of the plunger 34 which extends therethrough, and a second transverse slot 61 is formed therein between the slot 60 and the rear wall 54 for a purpose to be described hereinafter. An opening 62, large enough to permit the entrance of a mouse or other rodent for which the trap is to be set, is contained in the front wall 53. In operating form, the container is preferably permanently closed, except for the opening 62, and the aligned openings 61 and 64, the latter being provided in the upper rear flap 66 as shown in Fig. 4.

Operation

To set the trap, the container 16 with the plunger assembly 14 disposed therein is held with its longitudinal axis horizontal or with the opening 62 tilted downwardly. The free end of the plunger stem 36 is then pulled upwardly out of the container 16, thereby compressing the spring 45. As the plunger stem 36 is pulled out of the container 16, the free end of the tab 42 rides upwardly on the inner surface of the trip plate 46. When the tab 42 passes beyond the upper edge of the detent 51, the trip plate 46 swings toward the plunger 34 so that, when the plunger is released, the shoulder 52 of the detent 51 engages the free end of the tab 42, thereby retaining the plunger 34 in a cocked or armed position.

It is to be understood that either before or after the plunger is cocked, the trap can be positioned so that the top wall 58 faces upwardly and a piece of bait dropped into the container through the slot 61, thereby positioning it on the far side of the trip plate 46. As shown in Fig. 7, the trip plate 46 extends substantially from wall to wall of the container so that it is impossible for a mouse or other rodent to paw the bait around the edge of the trip plate and escape being caught.

It is apparent that with this construction the person setting the trap does not have to fear accidental tripping of the plunger 34, because, if it does occur, there is no chance of the person being injured because it is totally enclosed by the container 16.

The openings 50 in the trip plate 46 permit the mouse or other rodent peering into the opening 62 to see the light entering the container through the slot 61 so that it is not so reluctant to enter.

When a mouse or other rodent enters the opening 62 and attempts to reach the bait located on the far side of the trip plate 46, it pushes against the latter, thereby causing it to pivot away from the plunger 34. As the trip plate pivots outwardly, the shoulder 52 of the detent 51 moves away from the end of the tab 42, thereby releasing the plunger 34. When the plunger 34 is released, the spring 45 drives it downwardly, plunging the teeth 44 into the body of the mouse.

The lower ends of the grooves 30 limit the downward movement of the plunger 34 so that the teeth 44 will not penetrate the bottom 55 of the container 16 when the plunger is tripped.

As will be noted from Figs. 4, 8 and 10, and as commented on previously, the cross portions 48 and 49 of the T-shaped projection 47 are of unequal length, as are the portions 26 and 27 of the groove 24. Therefore, there is no chance of the assembler inadvertently suspending the trip plate 46 in the U-shaped frame 18 so that the detent 51 is facing in the wrong direction, without immediately perceiving the error.

The edges 23 of the U-shaped frame 18 bear against the rear wall 54 of the container so as to aid in the proper positioning of the plunger assembly 14 therein. Also, the assembly 14 is quite long so as to prevent it from being displaced by pivoting around the plunger stem portion 36 in the slot 60 due to the action of the trapped rodent.

Because the body of the mouse is totally within the container 16, a person can pick up the trap 12 and dispose of both it and the mouse without having to touch or view the remains of the latter.

Thus, it is apparent that there has been provided a novel rodent trap which fulfills all the objects sought therefor.

It is to be understood that the foregoing description and the accompanying drawing have been given only by way of illustration and example, and that changes and alterations in the present disclosure, which will be readily apparent to one skilled in the art, are contemplated as within the scope of the present invention which is limited only by the claims which follow.

What is claimed is:

1. A plunger assembly for use in a rodent trap, comprising a plunger and means for reciprocally supporting the plunger, said means including a transverse portion having a transverse groove formed adjacent one edge thereof and a slot leading into the groove from said edge, the portions of the groove on each side of the slot being of unequal length; trigger means pivotally mounted on the transverse portion, said last named means including a T-shaped projection having a vertical portion and transverse portions extending normal thereto, the transverse portions being of unequal length, and means for releasably maintaining the plunger in a cocked position.

2. A plunger assembly for use in a rodent trap, comprising a plunger means for reciprocally supporting the plunger, a trigger member for releasably maintaining the plunger in a cocked position; and means for removably and pivotally mounting the trigger member on the support means including a T-shaped projection having a vertical portion and opposed transverse portions extending normal thereto, said transverse portions being of unequal length.

3. A disposable rodent trap, comprising a box-like container of cardboard or like material including a hinged cover having a slot therein; and a plunger assembly positioned within the container, the plunger assembly including a stationary sheet metal frame of inverted U-shape having a flat transverse top portion snugly fitting underneath the top of said container and depending leg portions disposed against the side walls of said container and being of rectangular configuration of a height substantially the same as the interior of said container and having a flat edge bottom resting on the bottom surface of said container so as to be disposed against any rocking movement within the container, a sheet metal plunger of inverted T-shape reciprocally mounted in the frame and movable between a tripped position and a cocked position, the upper end of the plunger extending through the slot in the cover to maintain the plunger assembly in longitudinal position relative to the ends of the container without additional fastening means between the plunger assembly and the container, spring means disposed between the frame and the plunger urging the plunger toward the tripped position, and means for releasably holding the plunger in the cocked position.

4. A plunger assembly for use in a rodent trap, comprising a sheet metal frame of inverted U-shape having a transverse portion and depending leg portions adjacent the ends thereof; a sheet metal plunger of inverted T-shape reciprocally mounted in the frame and movable between a tripped position and a cocked position; an arm-like portion struck from the body of the vertically extending part of the plunger so as to extend outwardly therefrom below the transverse portion of the frame; and trigger means pivotally suspended from the transverse portion of the frame adjacent the plunger, said last named means having a shoulder for engagement with the arm-like portion of the plunger for releasably maintaining the latter in the cocked position.

5. A plunger assembly for use in a rodent trap, comprising a sheet metal frame of inverted U-shape having a transverse portion and depending leg portions adjacent the ends thereof, the transverse portion containing a slot adjacent one edge and a groove adjacent the other edge, and a notch extending from the groove to the edge adjacent thereto; a sheet metal plunger of inverted T-shape reciprocally mounted in the slot and movable between a tripped position and a cocked position; an arm-like portion struck from the vertically extending part of the plunger so as to extend normal thereto below the transverse portion of the frame; and plate-like trigger means having a T-shaped upper portion suspended from the groove in the transverse portion of the frame so as to be disposed adjacent the plunger, said trigger means having a shoulder pressed therefrom for engagement with the end of the arm-like portion of the plunger for releasably maintaining the latter in the cocked position.

6. A disposable rodent trap, comprising a box-like container of cardboard or like material; and a plunger assembly positioned within the container, said plunger assembly including a stationary sheet metal frame of inverted U-shape having a flat transverse top portion snugly fitting underneath the top of said container and depending leg portions disposed against the side walls of said container and being of rectangular configuration of a height substantially the same as the interior of said container and having a flat edge bottom resting on the bottom surface of said container so as to be disposed against any rocking movement within the container, a planiform sheet metal plunger of inverted T-shape reciprocably mounted in the frame with its ends slidably disposed in vertical grooves in said leg portions so as to be completely self contained within said frame and movable between a tripped position and a cocked position, spring means disposed between the plunger and said frame urging the plunger toward the tripped position, and means for releasably holding the plunger in the cocked position.

JOHN L. LEHMAN.

References Cited in the file of this patent

UNITED STATES PATENTS

| Number | Name | Date |
|---|---|---|
| 363,554 | Sewel | May 24, 1887 |
| 432,139 | Kerns | July 15, 1890 |
| 996,599 | Harding | June 27, 1911 |
| 1,027,974 | Barker | May 28, 1912 |
| 1,262,946 | Harriman | Apr. 16, 1918 |
| 1,281,403 | Marcell | Oct. 15, 1918 |
| 2,104,083 | Krahl | Jan. 4, 1938 |
| 2,149,311 | Potts | Mar. 7, 1939 |
| 2,359,341 | Weil | Oct. 3, 1944 |
| 2,391,640 | Nemec | Dec. 25, 1945 |
| 2,454,476 | Price | Nov. 23, 1948 |
| 2,518,819 | Roessler | Aug. 15, 1950 |

FOREIGN PATENTS

| Number | Country | Date |
|---|---|---|
| 21,680 | Great Britain | of 1898 |
| 28,017 | Great Britain | of 1906 |